(12) United States Patent
Carpenter

(10) Patent No.: US 6,268,035 B1
(45) Date of Patent: Jul. 31, 2001

(54) TIRE BLOCK AND METHOD OF MAKING THE SAME

(75) Inventor: Robert K Carpenter, Metamora, MI (US)

(73) Assignee: The Detroit Edison Company, Detroit, MI (US)

( * ) Notice: Subject to any disclaimer, the term of this patent is extended or adjusted under 35 U.S.C. 154(b) by 0 days.

(21) Appl. No.: 09/624,714

(22) Filed: Jul. 25, 2000

(51) Int. Cl.[7] ................................................. B32B 3/02
(52) U.S. Cl. ................... 428/64.1; 428/131; 428/222; 428/223; 428/903.3; 405/16; 405/129; 405/258; 405/262; 405/284; 52/DIG. 9
(58) Field of Search ................................. 428/903.3, 222, 428/131, 223, 64.1; 405/16, 258, 284, 262, 272, 129; 52/DIG. 9; 211/23

(56) References Cited

U.S. PATENT DOCUMENTS

| | | |
|---|---|---|
| 3,928,701 * | 12/1975 | Roehner ................................ 428/222 |
| 4,057,141 | 11/1977 | Laurie et al. . |
| 4,997,309 | 3/1991 | Kiselewski . |
| 5,284,326 | 2/1994 | Chiovitti et al. . |
| 5,364,206 | 11/1994 | Marienfeld . |
| 5,370,475 * | 12/1994 | LeBlanc ................................. 405/21 |
| 5,746,545 | 5/1998 | Parker, Jr. . |

* cited by examiner

Primary Examiner—Deborah Jones
Assistant Examiner—Abraham Bahta
(74) Attorney, Agent, or Firm—Reising, Ethington, Barnes, Kisselle, Learman & McCulloch, P.C.

(57) ABSTRACT

A tire block is made of a plurality of elongated tire tread strips arranged end-to-end and wound in a spiral wrap of overlying convolutions. Fasteners secure the tire tread strips together. The tire tread strips are made from motor vehicle tires by removing the side walls and transversely splitting the tread.

10 Claims, 2 Drawing Sheets

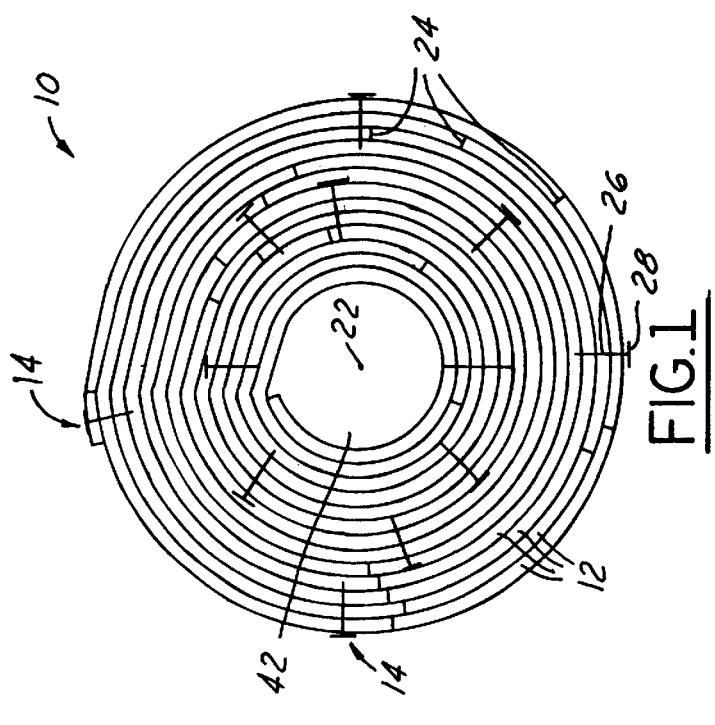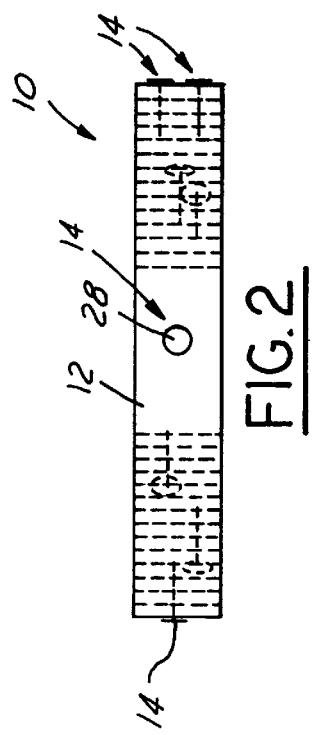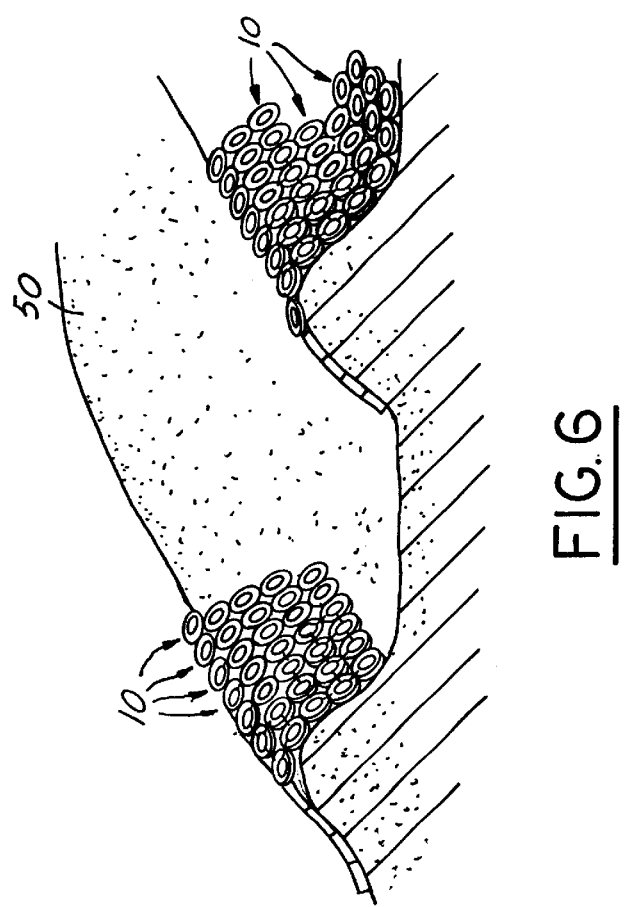

TIRE BLOCK AND METHOD OF MAKING THE SAME

This invention relates generally to tire blocks made from the treads of automotive vehicle tires.

BACKGROUND OF THE INVENTION

There is a continued and heightened awareness of the need for an environmentally safe method of disposal or reuse of waste tires. Under ideal conditions, scrap tire disposal is costly and problematic, and under poor conditions scrap tire piles can lead to highly toxic, uncontrollable fires or water retention resulting in severe insect infestations. Disposal of scrap tires has become highly regulated and controlled in nearly every aspect following the initial life of the tire on an automobile or truck.

Numerous methods have been developed for the reprocessing of scrap tires, including the creation of tire-derived fuels (TDF), the burning of tires in a furnace, generating heat for the production of electricity, producing crumb rubber that is used in the manufacture of rubber-based mats and asphalt or used loose as a sub-base, or cut and shaped from the natural state to form bushings and seals. However, there remains a need to find other uses of waste tires.

SUMMARY OF THE INVENTION

In accordance with the present invention, a valid use of old tires is provided by removing the side walls and transversely splitting the tread to provide a plurality of elongated tire tread strips. The tread strips are arranged end-to-end in a spiral wrap of overlying convolutions. The tread strips are secured together, preferably by driving fasteners through the overlying convolutions.

Further in accordance with the invention, a plurality of the tire blocks may be grouped together or secured together in a layer for the prevention of soil erosion as, for example, along the banks of a river or a ravine, or to make a temporary cross-over in a river bed to permit vehicles to move from one side to the other.

The tire block of this invention uses a minimum of energy to extract the most difficult portion of the scrap tire to recycle, namely, the steel-belted tread. The sidewalls are cut away, leaving the steel belt intact in the tread and covered by a nominal thickness of rubber. This rubber covering results in a safe to handle product, and eliminates any leaching potential to waterways. All grades of scrap can be used in the manufacture of a tire block, including scrap which is clean or dirty, near new or heavily worn, intact or damaged and of any size. Limited power requirements, as opposed to most other methods of manufacture or processing of scrap tires, lends itself to a mobile operation allowing the processing plant to be brought to the raw material, thus reducing shipping and handling of whole tires.

The structural physical properties of a tire block are remarkable due to the inherent strength of the intact tread portion of the tire, the durability and impact resistance of rubber, and the method of assembly which results in a multiplicity of treads to withstand both compression and impact loads, resilience due to freezing and thawing or natural earth movements, and insolubility in water.

The tire block, with its method of manufacture, lends itself to multiple methods of joining one tire block to another, one tire block to a fixed object, or one tire block or a multiple tire block stack to a subbase or earth through the use of pins, rods, staples, lashing through the ply of the tire block, or ground driven pipes through the center hole.

In accordance with the invention, scrap tire treads are wrapped and fastened in such a manner as to create a cylindrical building component with a height equal to the width of the tire tread and a diameter dictated by construction requirements and the number of treads used in manufacture. This cylindrical building component, or tire block, when stacked and fastened together creates a highly effective, durable, and erosion resistant building component.

The tire block when fastened together and set atop, or integrated into, a levee or a dike will reduce the potential for soil erosion during times of high tide, thus eliminating the catastrophic failure of a levee or dike. The inherent strength, due to the nature of the method of manufacture and the rubber and belt combination, allows the tire block to be used where pedestrian or vehicle traffic may result with no degradation to structural integrity.

Also in accordance with the invention, a significant quantity of tire treads may be reused in the manufacture of tire blocks thus diverting scrap rubber from landfills stockpiles, and illegal dumping sites.

One object of this invention is to provide a tire block having the foregoing features and capabilities.

Another object is to provide a tire block that may be easily handled, and that will not cause harm to humans or animals due to incidental contact.

Another object is to provide a simple and efficient method of making a tire block.

These and other objects, features and advantages of the invention will become more apparent as the following description proceeds, especially when considered with the accompanying drawings.

BRIEF DESCRIPTION OF THE DRAWINGS

FIG. 1 is a top plan view of a tire block constructed in accordance with this invention.

FIG. 2 is a side elevational view of the tire block shown in FIG. 1.

FIG. 6 is a perspective view showing a plurality of tire blocks laid over levies or banks on opposite sides of a river to prevent erosion in the event of flooding.

DETAILED DESCRIPTION OF THE PREFERRED EMBODIMENT

Referring now more particularly to the drawings, and especially to FIGS. 1 and 2, a tire block 10 comprises a plurality of elongated tire tread strips 12 arranged end-to-end in a spiral wrap of overlying convolutions, secured together by fasteners 14.

Figure 3:
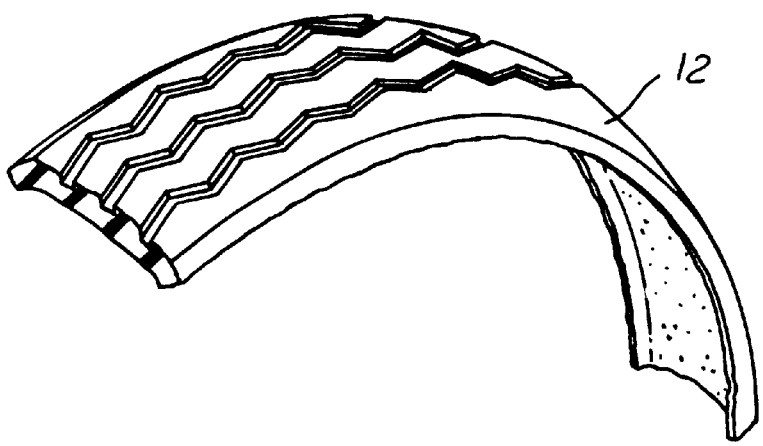
FIG. 3 is a fragmentary view showing a single tire tread strip in perspective which is one of several similar tread strips employed in forming the tire block of this invention.
Figure 4:
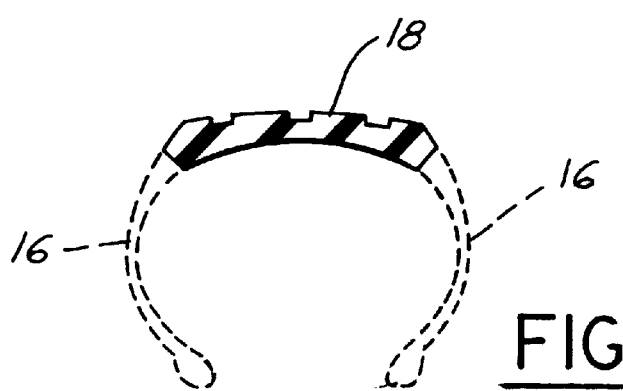
FIG. 4 is a cross section of the tire tread strip shown in FIG. 3, and also showing in broken lines, the side walls and tire beads of a tire from which the tread strip is made.

The tire tread strips 12 are made from used automotive vehicle tires, usually used or discarded tires, by removing the side walls 16 and transversely splitting the tread 18 (see FIG. 4). The resulting tread strips 12, being of the flexible rubber or rubber-like material of which automotive vehicle tires are typically made, are rolled in the spiral configuration shown in FIG. 1 by taking a first tread strip and rolling it into a circular shape with the ends overlapping, following with a second tread strip having one end thereof abutting the outer overlapping end of the first strip and rolling the second strip into a spiral configuration over the first strip, and so on until a tire block of the desired size is formed. If the tire is steel-belted, the steel belting may remain intact in the treads. The convolutions of the tire tread strips 12 are wound spirally about a central axis 22 at the center of the tire block. The abutting ends 24 of the tire tread strips may, if desired, be secured together as by a suitable adhesive, but that is not necessary. As the tire block is built-up in this manner, the fasteners 14 are driven radially into the overlapping convolutions. The fasteners preferably are in the form of staples or nails having an elongated barbed shank 26 to resist withdrawal, and a head 28 for striking with a hammer to drive the fasteners into and through the tire tread strips.

Figure 5:
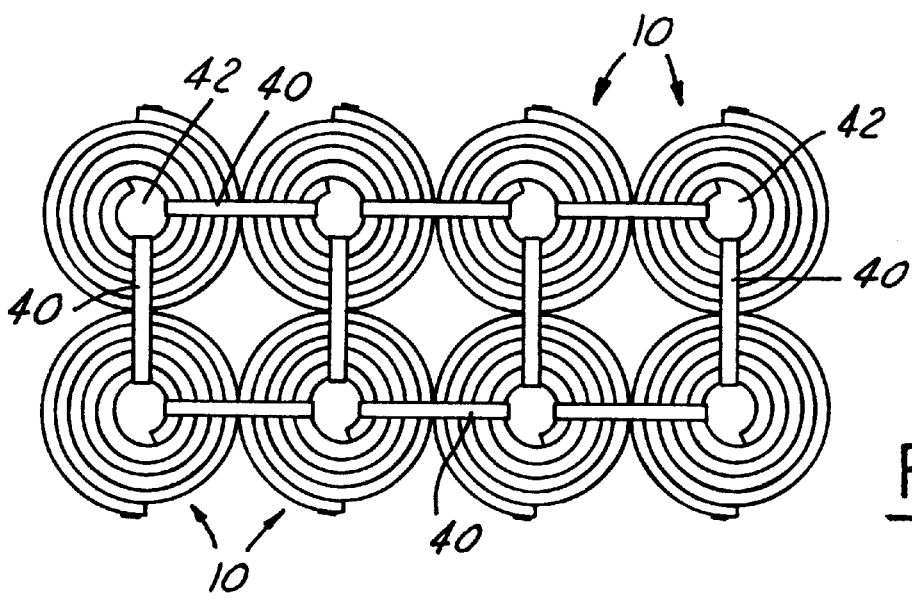
FIG. 5 is a view showing a plurality of tire blocks banded together.

A plurality of tire blocks may be laid edge-to-edge with the outermost convolutions of adjacent tire blocks in contact with one another and with the central axes 22 of the tire blocks substantially parallel. Such an arrangement is shown in FIG. 5 where straps 40 extended through the central opening 42 in the tire blocks secure adjacent tire blocks together so that a layer of tire blocks is formed.

FIG. 6 shows a plurality of tire blocks laid edge-to-edge along the banks of a river 50 to prevent soil erosion in the event of flooding, for example. The tire blocks in FIG. 6 may be secured together edge-to-edge by straps as shown in FIG. 5, or the straps may be omitted and the tire blocks merely laid in the pattern shown. The tire blocks have sufficient weight to maintain their positions in a layered arrangement, although in some situations it may be desirable to bind them together by straps or the like as shown in FIG. 5.

What is claimed is:

1. A tire block comprising a plurality of elongated tire tread strips made from motor vehicle tires having a tread and side walls, by removing the side walls and transversely splitting the tread, said tread strips being arranged in substantially abutting end-to-end relationship in a spiral wrap of overlying convolutions disposed in a common plane, and means for securing said tread strips together in said spiral wrap.

2. A tire block as defined in claim 1, wherein said means comprises fasteners driven through overlying convolutions of the tread strips in the spiral wrap.

3. A tire block as defined in claim 2, wherein each of said fasteners is of a configuration to resist withdrawal.

4. A tire block as defined in claim 2, wherein each of said fasteners has a head and a barbed shank to resist withdrawal.

5. A tire block layer comprising a plurality of tire blocks;

each of said tire blocks comprising a plurality of elongated tire tread strips made from motor vehicle tires having a tread and side walls, by removing the side walls and transversely splitting the tread, the tread strips of each of said tire blocks being arranged in substantially abutting end-to-end relationship in a spiral wrap of overlying convolutions in which the convolutions are disposed in a common plane and extend around a central axis at the center of said tire block, first means securing the tread strips of each of said tire blocks together in said spiral wrap, and second means securing said tire blocks together edge-to-edge with the outermost convolutions of adjacent tire blocks in contact with one another and with the central axes of said tire blocks substantially parallel.

6. A tire block layer as defined in claim 5, wherein said first means comprises fasteners driven through overlying convolutions of the tread strips of each of said tire blocks in the spiral wrap.

7. A tire block layer as defined in claim 6, wherein each of said fasteners has a shank of a configuration to resist withdrawal.

8. A tire block layer as defined in claim 6, wherein each of said fasteners has a head and a barbed shank to resist withdrawal.

9. A tire block as defined in claim 2, wherein the ends of adjacent tread strips are secured together.

10. A tire block layer as defined in claim 6, wherein the ends of adjacent tread strips of each of said tire blocks are secured together.

* * * * *